Patented Apr. 9, 1929.

1,708,697

UNITED STATES PATENT OFFICE.

CHRIS JENSEN, OF KANSAS CITY, MISSOURI.

DUST COLLECTOR.

Application filed November 14, 1927. Serial No. 233,076.

The present invention relates to dust collecting devices, and aims to provide an improved form of construction of that type of dust collector in which the separation of the dust particles is effected by the whirling movement of the dust-laden air within the device.

Accordingly, one of the objects of the invention is to provide a novel construction comprising a casing having suitable intake and air outlet passages, together with a partition structure within the casing composed of a plurality of partition members of upwardly flaring form to provide a plurality of dust trapping chambers for effecting the required separation of the dust particles from the air before the latter is discharged through the air outlet passage.

It is also an object of the invention to provide a duplex form of collector construction in which each unit of the device has the character of construction just indicated, and provided with suitable conduit passages for affording both a common inlet conduit member for both units, as well as a common air outlet passage leading from both units.

It is also sought to provide an improved construction of this general type which will be not only efficient for carrying out the required air cleaning functions, but also of a comparatively simple and inexpensive character adapted for cheapness of manufacture and operation.

With the foregoing general objects in view, the invention will now be described with reference to the accompanying drawings illustrating one form of construction which I have found to be practicable for embodying the proposed improvements, after which those features and combinations deemed to be novel will be defined in the appended claims.

In the drawings:—

Figure 3:
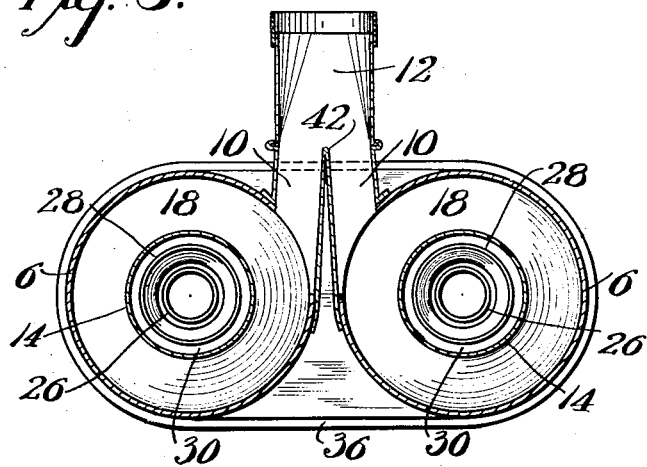
Figure 3 is a horizontal sectional view, the plane of the section being indicated by the line III—III of Figure 1.

Referring now to said drawings in detail, these illustrate the improved collector construction as comprising a pair of collector units each made up of a casing composed of a cylindrical upper portion 6 and a lower elongated tapered portion 7 provided with a dust outlet extension 8 coinciding with the axial line of the units. The cylindrical portion 6 of each unit is provided with the usual tangential intake passage 10 (see Figures 1 and 3), for the intake of the dust-laden air which is driven into the device from a conduit 12 communicating with a blower or whatever means is employed for supplying the dust collector with the air to be cleaned, such means not being illustrated, the same forming no part of the present invention.

Within the upper or cylindrical portion 6 of each of the units of my device, I provide a partition structure for the purpose of forming a plurality of dust-trapping chambers suitably located in the path of the air as it moves from the intake passage 10 and upwardly in the direction of the air discharge outlet at the top of the device. In each case this partition structure comprises a plurality of partition members or elements, all being open for the passage of the air upwardly along the axial line of the casing. The lower partition member 14 is of upwardly flaring form provided with an air intake passage 15 at its lower end substantially in the plane of the connection between the cylindrical portion 6 and the lower tapered portion 7 of the casing as shown in Figure 1; the upper margin of said partition member 14 is suitably welded to form an airtight connection, as indicated at 16, with the interior face of the casing 6, thus forming a dust-trapping chamber 18 between the partition member 14 and the lower portion of the casing portion 6.

Figure 1:
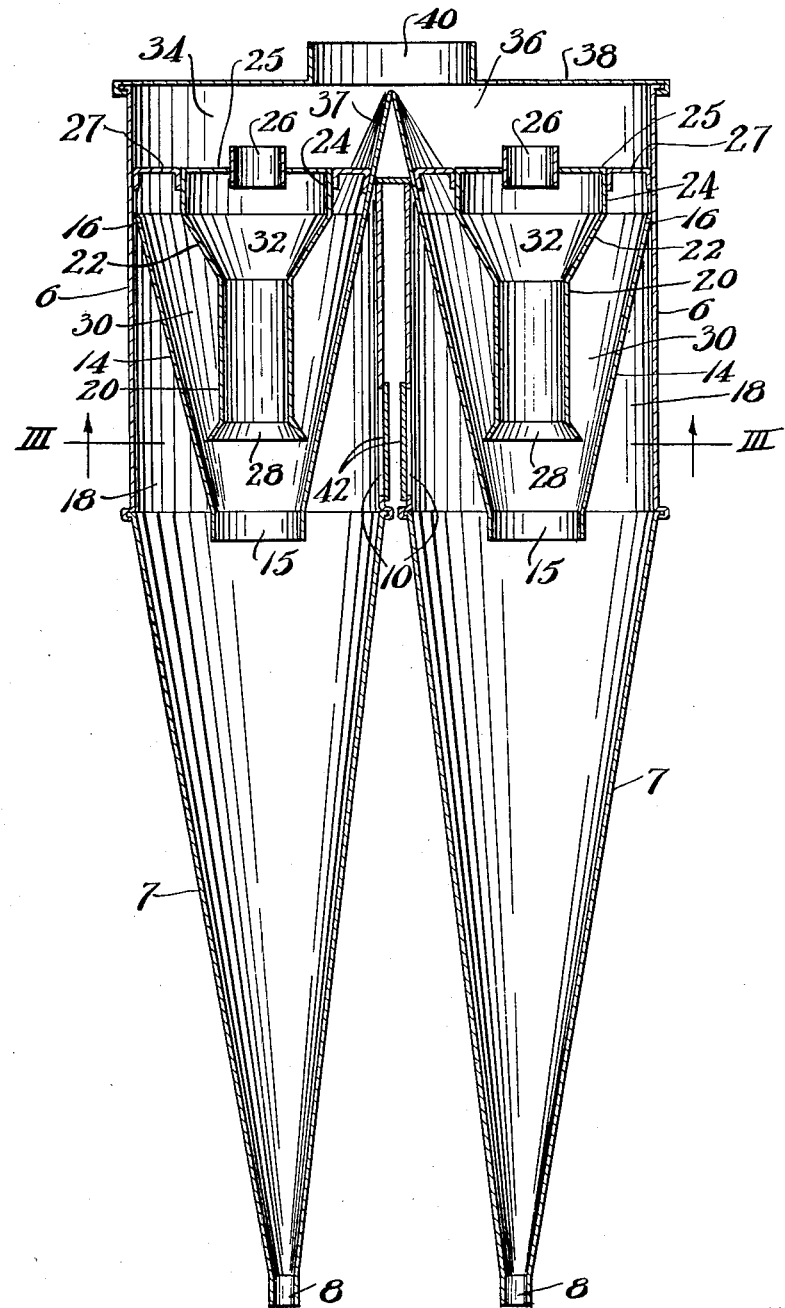
Figure 1 is a central vertical sectional view, illustrating a dust collector constructed in accordance with the present invention, the plane of the section being indicated by the line I—I of Figure 2.
Figure 2:
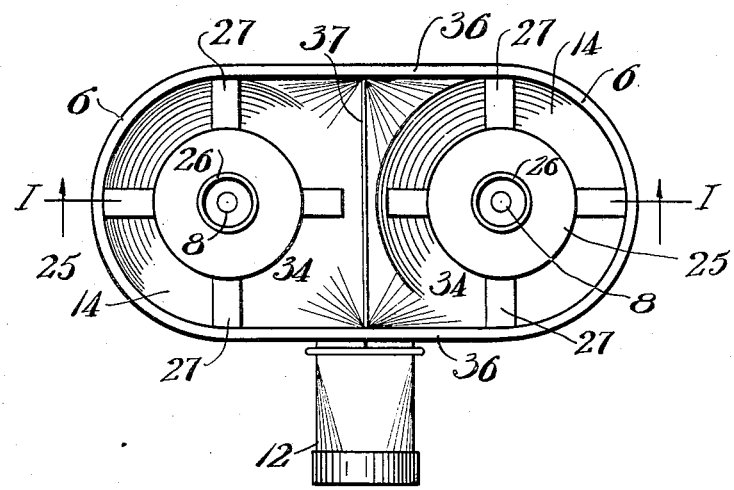
Figure 2 is a plan view of the top of the collector, with the top portion of the casing removed.

Enclosed by the partition element or member 14 is a second partition member comprising a cylindrical portion 20 and an upper flaring portion 22 terminating in a cylindrical top portion 24 provided with a top closure portion 25 fitted with an air outlet tube 26 in axial alinement with the passage through the cylindrical portion 20, the lower end of which is formed with a downwardly flaring air intake extension 28, as clearly illustrated in Figure 1. The air outlet 26 is slightly smaller in diameter than the diameter of the cylindrical portion 20, and the latter in turn is of a smaller diameter than the air intake passage 15 at the lower end of the partition member 14.

It will thus be seen that a second dust-trapping space or chamber 30 is formed by the space between the partition member 20—22 and the partition member 14, and a third dust collecting chamber 32 is formed by the space within the partition member 20—22, from which the air leaves by way of the restricted outlet passage 26. The inner partition member 20—22 is suspended in the axial position, as illustrated, by means of bracket elements 27 welded to the top portion 24 and also at different points to the interior of the casing 6. By means of this construction, and with the top of the partition member 20—22 located some distance below the top of the casing, both chambers 30 and 32 discharge into a final dust collecting space 34 within the top of the casing 6.

For uniting two units of my construction to form a duplex assembly, I provide a suitable sheet metal construction 36 at both the front and rear, for uniting the top portions 6 of each pair of units and also forming a partition 37 between the upper chambers 34, and the whole being closed by a top casing or cover member 38 which is provided with an air outlet or discharge passage 40 of suitable size located over the partition 37, as clearly indicated in Figure 1. A partition member 42 is provided between the lower portions of the casings 6 for dividing the conduit passage 12 and forming separate inlet passages 10 leading into the first dust-trapping chambers 18 (see Figure 3).

It will thus be apparent that I have devised a practical and efficient construction for carrying out all desired objects of the invention, it being understood that the dust-laden air from the conduit 12 is divided and the flow distributed equally to the two units of the device, in each of which the first action is a trapping of the dust particles from the incoming air as this moves tangentially, with a vigorous whirling movement, around the interior of said chamber 18 and the upper portion of the tapered portion 7 of the casing. As the dust particles settle toward the dust outlet 8, the air continues moving upward, axially of the device to replace that removed by way of the discharge outlet 40, and a second separation of the dust particles from the air takes place within the upwardly flaring or expansion chamber 30 of each unit, and then again within the expansion chamber 32 of each unit, the air then collecting within the chamber 34 from both of said chambers 30 and 32, the removed dust particles settling down through the openings at the lower ends of the partition members and thence to the outlet 8. A very effective dust-trapping action is produced by the particular flaring construction of the partition members and chambers, and the successively decreasing sizes of the openings 15 to 26, and the air finally escaping through the outlet 40 is found to be substantially free of any foreign matter. By providing a pair of such dust collecting units in each assembly, a very efficient, as well as economical dust collecting construction is provided, and while I have illustrated what I now regard as the preferred mode of practicing my invention, I desire to reserve the right to make all such changes or modifications as may fairly fall within the scope of the appended claims.

Having thus described my invention, what I claim and desire to secure by Letters Patent is:—

1. A dust collector comprising a casing having an upper cylindrical portion provided with an intake passage and also with an air outlet passage, and a lower tapered portion terminating in a dust outlet opening, and a partition structure in said cylindrical portion comprising a plurality of spaced and upwardly flaring partion members forming separate dust-trapping chambers with their entrance openings alined coaxially with the casing, the upper partition member terminating short of the top of the casing and permitting communication between the dust-trapping chamber surrounding said upper partition member and the upper portion of the casing.

2. A dust collector comprising a casing having an upper cylindrical portion provided with an intake passage and also with an air outlet passage, and a lower tapered portion terminating in a dust outlet opening, a downwardly tapered partition member open at its lower end and forming a dust-trapping chamber between said partition and the cylindrical portion of the casing, and a second partition member enclosed by said first member and spaced therefrom to form a dust-trapping chamber between said partition members, said second partition member having an intake opening slightly smaller than the lower end of said first partition member and also provided at its upper end with an outlet opening of smaller size than said intake opening.

3. A dust collector comprising a casing having an upper cylindrical portion provided with an intake passage and also with an air outlet passage, and a lower tapered portion terminating in a dust outlet opening, a downwardly tapered partition member open at its lower end and forming a dust-trapping chamber between said partition and the cylindrical portion of the casing, and a second partition member enclosed by said first member and spaced therefrom to form a dust-trapping chamber between said partition members, said second partition member having its cylindrical lower portion provided with an intake opening and an enlarged upper portion provided with an outlet opening of smaller size than said intake opening.

4. A dust collector comprising a pair of casings each having an upper cylindrical portion and a lower tapered portion terminating in a dust outlet opening, a partition structure in each of said casings comprising a plurality of spaced and upwardly flaring partition members forming separate dust-trapping chambers having centrally alined receiving passages, a housing and air discharge outlet member providing a common air outlet passage communicating with the tops of both of said casings, and a conduit structure provided with a partition forming independent intake passages communicating with the cylindrical portions of both of said casings outside the partition structures therein.

5. A dust collector comprising a pair of casings each having an upper cylindrical portion and a lower tapered portion terminating in a dust outlet opening, a partition structure in each of said casings comprising a plurality of spaced and upwardly flaring partition members forming separate dust-trapping chambers having centrally alined receiving passages, a housing embracing the tops of said casings and having an air outlet passage in position to receive the discharge from both the said casings, and a conduit structure comprising separate conduit passages communicating tangentially with the cylindrical portions of said casings outside the partition structures therein.

In witness whereof I hereunto affix my signature.

CHRIS JENSEN.